United States Patent
Kim et al.

(10) Patent No.: US 10,027,691 B2
(45) Date of Patent: Jul. 17, 2018

(54) APPARATUS AND METHOD FOR PERFORMING REAL-TIME NETWORK ANTIVIRUS FUNCTION

(71) Applicant: ELECTRONICS AND TELECOMMUNICATIONS RESEARCH INSTITUTE, Daejeon (KR)

(72) Inventors: Sung-Jin Kim, Daejeon (KR); ByungJoon Kim, Daejeon (KR); HyoungChun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 252 days.

(21) Appl. No.: 14/791,929

(22) Filed: Jul. 6, 2015

(65) Prior Publication Data
US 2016/0065595 A1    Mar. 3, 2016

(30) Foreign Application Priority Data
Sep. 3, 2014 (KR) .................. 10-2014-0116875

(51) Int. Cl.
*H04L 29/06* (2006.01)

(52) U.S. Cl.
CPC .... *H04L 63/1416* (2013.01); *H04L 29/06877* (2013.01); *H04L 29/06884* (2013.01); *H04L 63/101* (2013.01)

(58) Field of Classification Search
CPC . H04L 63/1416; H04L 63/101; H04L 63/145; H04L 29/06877; H04L 29/06884
See application file for complete search history.

(56) References Cited

U.S. PATENT DOCUMENTS

| | | | | |
|---|---|---|---|---|
| 8,024,473 B1 * | 9/2011 | Mahadik | ............. | H04L 63/1408 709/225 |
| 8,997,227 B1 * | 3/2015 | Mhatre | ............... | H04L 63/1416 726/23 |

(Continued)

FOREIGN PATENT DOCUMENTS

KR    10-2010-0124441 A    11/2010

OTHER PUBLICATIONS

Ying-Dar Lin et al., "Designing an Integrated Architecture for Network Content Security Gateways," IEEE Computer, Nov. 2006, vol. 39, No. 11, pp. 66-72.

*Primary Examiner* — Hadi S Armouche
*Assistant Examiner* — Alexander R Lapian
(74) *Attorney, Agent, or Firm* — LRK Patent Law Firm (57) ABSTRACT

An apparatus and method for performing a real-time network antivirus function, which can perform, at high speed, real-time antivirus scanning on a transmission file in a network to be protected and blocking of a malicious file. The apparatus includes a packet processing unit for parsing input packets and outputting a transmission data stream, a packet-based checksum calculation unit for calculating a checksum of the transmission data stream for each packet, and outputting a signature included in the transmission data stream when a last packet of the transmission data stream is input, a virus scanning unit for performing virus scanning based on the signature, a detection and blocking unit for blocking each input packet or transmitting it to a destination, based on result of the virus scanning unit, and a caching unit for updating a blacklist, based on result of the detection and blocking unit.

10 Claims, 5 Drawing Sheets

(56) References Cited

U.S. PATENT DOCUMENTS

| | | | |
|---|---|---|---|
| 2008/0313738 A1* | 12/2008 | Enderby | G06F 21/554 |
| | | | 726/24 |
| 2009/0100055 A1* | 4/2009 | Wang | G06F 21/564 |
| 2009/0138573 A1* | 5/2009 | Campbell | G06F 21/554 |
| | | | 709/218 |
| 2011/0051614 A1 | 3/2011 | Li et al. | |
| 2011/0138465 A1* | 6/2011 | Franklin | G06F 21/552 |
| | | | 726/23 |
| 2013/0097666 A1 | 4/2013 | Wu et al. | |

* cited by examiner

APPARATUS AND METHOD FOR PERFORMING REAL-TIME NETWORK ANTIVIRUS FUNCTION

CROSS REFERENCE TO RELATED APPLICATION

This application claims the benefit of Korean Patent Application No. 10-2014-0116875, filed Sep. 3, 2014, which is hereby incorporated by reference in its entirety into this application.

BACKGROUND OF THE INVENTION

1. Technical Field

The present invention generally relates to an apparatus and method for performing a real-time network antivirus function and, more particularly, to an apparatus and method that can perform, at high speed, real-time antivirus scanning on a transmission file in a network to be protected and blocking of malicious file transmission traffic over the network.

2. Description of the Related Art

Generally, antivirus software denotes a computer program equipped with a function of finding and removing a malicious file. Such antivirus software performs the task of determining whether the signature of an inspection target file is present in signatures recorded in a virus database (DB).

Existing methods of performing antivirus scanning over a network include an antivirus performance method using a proxy server. A proxy server is a computer machine for relaying a connection request and communication between a client and a server. There is an advantage in that the details requested by the proxy server may be stored in a cache, and in that the transmission time may be reduced because a client does not directly access a remote server. In this case, a file stored in the cache of the proxy server may be scanned using an antivirus program. Further, the proxy server delays a response to the request of the client until antivirus scanning is completed, block the client's access if it is determined that the file is a malicious file, and registers the corresponding file in a blacklist cache. Accordingly, other clients may be prevented from being infected with the malicious file.

However, the use of a proxy server is accompanied by issues related to security and performance. Further, the use of a proxy server results in a problem with personal information protection (privacy) because data requested or submitted by a user is stored in a cache for a predetermined period of time. Also, when a proxy server is infected with malicious code (malware) or the like, there is the concern that the stored data will be leaked to the outside of the proxy server. Furthermore, since the client is not directly connected to the remote server, and a dual connection structure, including the client-proxy connection and the proxy-remote server connection, is implemented, the problem of network transmission delay may arise.

In order to solve this problem, a method of performing an antivirus function in real time in a network using a network packet monitoring system such as an Intrusion detection and prevention system (IDPS) may be attempted. IDPS equipment functions to perform Deep Packet Inspection (DPI) on network packets, and generate a log for a packet corresponding to a detection rule or block the corresponding packet.

In order to perform an antivirus function over the network using such IDPS equipment, a file must be reconstructed by parsing transmission data streams, and must be stored in memory or on disk. Thereafter, a signature may be generated for the stored file, and then an antivirus function may be performed.

However, a performance load occurs upon storing a reconstructed file, and the load of the signature generation task is variable depending on the size of the original file. Therefore, it is difficult to complete antivirus scanning on a file and additionally perform packet blocking in real time before a transmission data stream is completed.

As related preceding technology, U.S. Patent Application Publication No. 2013-0097666 discloses technology for improving the transmission efficiency of a proxy gateway using a pre-classifier in a proxy gateway antivirus system, which corresponds to a method of performing an antivirus function over a network.

As another preceding technology, a paper entitled "Designing an Integrated Architecture for Network Content Security Gateways" (published by Ying-Dar Lin and three others) was published in IEEE Computer Volume 39, Issue 11, Page 66-72, in November, 2006. This paper discloses technology for configuring a proxy so that a gateway can inspect mail content and for preventing malicious mail or a malicious file from being transferred to a recipient by adding an anti-spam function and an antivirus function.

SUMMARY OF THE INVENTION

Accordingly, the present invention has been made keeping in mind the above problems occurring in the prior art, and an object of the present invention is to provide an apparatus and method for performing a real-time network antivirus function, which inspect in real time and in line whether a transmission file for a transmission data stream is malicious on a network, block a malicious file, and cache detection results, thus preventing the malicious file from flowing into the network to be protected or from leaking to the outside of the network to be protected.

In accordance with an aspect of the present invention to accomplish the above object, there is provided an apparatus for performing a real-time network antivirus function, including a packet processing unit for parsing input packet and outputting a transmission data stream; a packet-based checksum calculation unit for calculating a checksum of the transmission data stream for each packet of the input packet, and outputting a signature included in the transmission data stream when a last packet of the transmission data stream is input; a virus scanning unit for performing, virus scanning based on the signature; a detection and blocking unit for blocking the input packet or transmitting the input packet to a destination, based on a result output from the virus scanning unit; and a caching unit for updating a blacklist, based on a result output from the detection and blocking unit.

The packet-based checksum calculation unit may generates the signature by dividing the transmission data stream into N data blocks and consecutively performing a hash digest operation on the N data blocks.

The virus scanning unit may compare a virus database (DB) with the signature in an in-memory-based or Graphics Processing Unit (GPU)-based manner.

The virus scanning unit may utilize a data structure and an algorithm, in which a search time and a DB storage space are taken into consideration, upon performing the virus scanning.

The data structure may be one of a self-balancing binary search tree, a hash table, a one-dimensional array, and a bloom filter.

The detection and blocking unit may be configured to, if the result output from the virus scanning unit indicates a malicious result, block the input packet, and if the result indicates a normal result, forward the input packet.

The caching unit may be configured to automatically generate a detection rule for an Internet Protocol (IP) address or a Uniform Resource Locator (URL), which provides a transmission data stream of a malicious file, based on the result output from the detection and blocking unit, and to input the generated detection rule to the blacklist.

In accordance with another aspect of the present invention to accomplish the above object, there is provided a method for performing a real-time network antivirus function, including parsing, by a packet processing unit, input packet and outputting a transmission data stream; calculating, by a packet-based checksum calculation unit, a checksum of the transmission data stream for each packet of the input packet, and outputting a signature included in the transmission data stream when a last packet of the transmission data stream is input; performing, by a virus scanning unit, virus scanning based on the signature; blocking, by a detection and blocking unit, the input packet or transmitting, by the detection and blocking unit, the input packet to a destination, based on a result of virus scanning; and updating, by a caching unit, a blacklist based on a result of blocking the input packet or transmitting the input packet to the destination.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
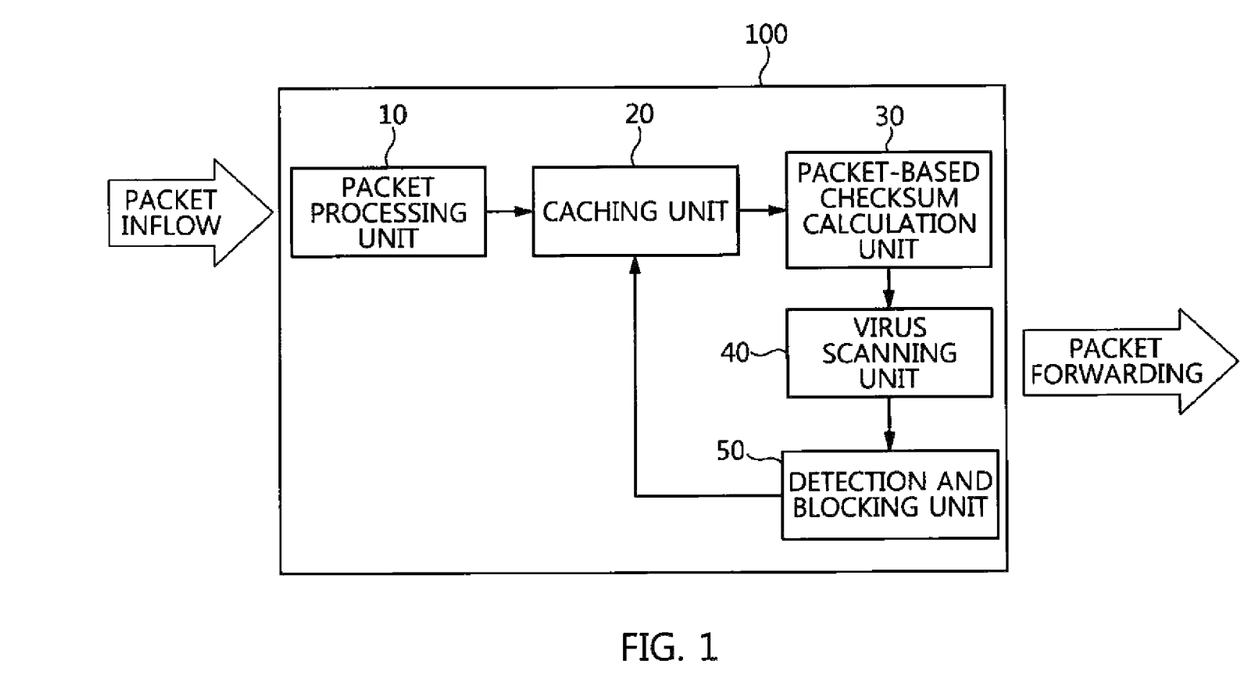
FIG. 1 is a configuration diagram showing an apparatus for performing a real-time network antivirus function according to an embodiment of the present invention.

FIG. 1 is a configuration diagram showing an apparatus for performing a real-time network antivirus function according to an embodiment of the present invention.

An apparatus 100 for performing a real-time network antivirus function according to an embodiment of the present invention includes a packet processing unit 10, a caching unit 20, a packet-based checksum calculation unit 30, a virus scanning unit 40, and a detection and blocking unit 50.

The packet processing unit 10 performs in-line packet collection, decoding, recombination, and protocol parsing over the network. That is, the packet processing unit 10 extracts a data stream to be transmitted (i.e., a transmission data stream) after packet processing tasks including network packet collection, decoding, and recombination have been performed. Further, the packet processing unit 10 transfers the transmission data stream to the packet-based checksum calculation unit 30.

In other words, the packet processing unit 10 may extract a transmission data stream by capturing/decoding/recombining transmission packets on the network. Here, the protocol used by the transmission data stream may be a Transmission Control Protocol/Internet Protocol (TCP/IP) or an application (L7) layer protocol, such as Hypertext Transfer Protocol (HTTP), Simple Mail Transfer Protocol (SMTP), or File Transfer Protocol (FTP).

The caching unit 20 automatically generates a detection rule for an IP address or a Uniform Resource Locator (URL) that provides the corresponding transmission data stream, based on the result of detection by the detection and blocking unit 50, and registers the detection rule in a blacklist or provides the detection rule to a separate Intrusion Detection Prevention System (IDPS).

In other words, the caching unit 20 automatically generates a detection rule for an IP address or a URL that provides a malicious file, based on the result of detection by the detection and blocking unit 50, and registers the detection rule in a blacklist or transfers the detection rule to separate TOPS equipment.

The packet-based checksum calculation unit 30 receives a transmission data stream recombined by the packet processing unit 10 as input, and gradually calculates the checksum for each packet That is, the packet-based checksum calculation unit 30 divides the transmission data stream received from the packet processing unit 10 into packets in conformity with the block size that is handled by the hash algorithm that is desired to be used, and performs a hash digest operation for each packet. Further, when the last packet of the transmission data stream is received, the packet-based checksum calculation unit 30 finally calculates the signature of the file included in the transmission data stream. Generally, a checksum denotes the sum that is used to check the accuracy of data. In most cases, in order to check whether the input or transmission of data has been desirably performed upon inputting or transmitting data, the sum of all pieces of data that have been previously transmitted is separately transmitted after the end of the input data or transmission data. Then, the data receiving side receives each piece of data, sums the received data, compares the summed data with the finally received checksum, and then verifies whether an error has occurred.

In other words, the packet-based checksum calculation unit 30 receives a file-format transmission data stream recombined by the packet processing unit 10. The packet-based checksum calculation unit 30 divides the payload of packets from the initial transmission packet to the last transmission packet into N blocks in conformity with the input size of the hash function that is desired to be used, and sequentially performs a hash operation on the N blocks. In this case, as an available hash algorithm group, a Message Digest 5 (MD5) algorithm group or a Secure Hash Algorithm (SHA) group, which is widely used to extract a file signature, may be exemplary. The packet-based checksum calculation unit 30 calculates the final signature of the transmission file when the last packet of the transmission data stream is input.

As described before, the packet-based checksum calculation unit 30 may generate the signature by dividing the transmission data stream into N data blocks and consecutively performing a hash digest operation on the N data blocks.

The virus scanning unit 40 performs a virus scanning operation at high speed in the memory or on the Graphics Processing Unit (GPU), based on the file signature finally generated by the packet-based checksum calculation unit 30. That is, the virus scanning unit 40 performs virus scanning to determine whether the file signature calculated by the packet-based checksum calculation unit 30 is present among signatures previously recorded in a virus DB, and transfers the result of virus scanning (detection) to the detection and blocking unit 50. Upon performing virus scanning, the virus scanning unit 40 compares the virus DB with the file signature at high speed, in an in-memory-based or GPU-based manner. Here, the virus scanning unit 40 utilizes a data structure and an algorithm in which a search time and a DB storage space are taken into consideration.

In other words, the virus scanning unit 40 performs a virus scanning task by using the calculated signature as input. At this time, the virus scanning task is performed in such a way as to perform high-speed signature matching in an in-memory-based or GPU-based manner. Further, the virus scanning task may be performed using various data structures and search algorithms, such as a self-balancing binary search tree, a hash table, a one-dimensional array, or a bloom filter, in consideration of the search speed and the storage space.

The detection and blocking unit 50 blocks a session or packet based on the result of detection by the virus scanning unit 40. That is, the detection and blocking unit 50 logs the detection result from the virus scanning unit 40. Further, the detection and blocking unit 50 blocks a current packet or an entire session if the detection result from the virus scanning unit 40 indicates a malicious result, and forwards the current packet if the detection result from the virus scanning unit 40 indicates a normal result.

In other words, if the detection result from the virus scanning unit 40 is determined to be malicious, the detection and blocking unit 50 may block the current packet or the entire current session. In contrast, if the detection result is determined to be normal, the detection and blocking unit 50 transmits the current packet to the destination without change. Further, the detection and blocking unit 50 generates a log.

Figure 2:
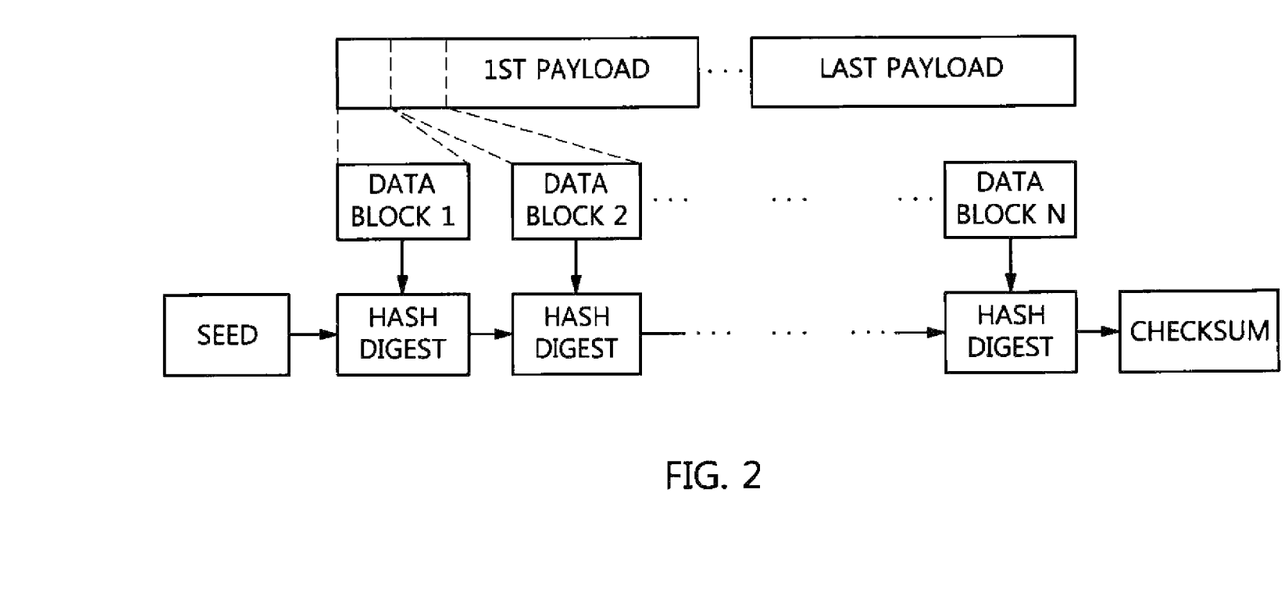
FIG. 2 is a diagram employed in the description of the operation of a packet-based checksum calculation unit shown in FIG. 1.

FIG. 2 is a diagram employed in the description of the operation of the packet-based checksum calculation unit 30 shown in FIG. 1.

The generation of a signature in a transmission file is performed by dividing a transmission data stream into N blocks and consecutively performing a hash digest operation on the N blocks. The outputting the signature by the packet-based checksum calculation unit 30 may comprise generating the signature by dividing the transmission data stream into N data blocks and consecutively performing a hash digest operation on the N data blocks.

The size of a single data block differs according to the type of hash function that is desired to be used. The number of data blocks included in a single packet payload may also differ according to the type of hash function that is desired to be used.

A seed value and a first data block are received as input, and a hash chain operation leading to the last data block is performed, and thus the signature of the file is gradually calculated.

Then, when the payload of the last packet is transferred to the packet-based checksum calculation unit 30, the packet-based checksum calculation unit 30 generates the signature of the transmission file.

Figure 3:
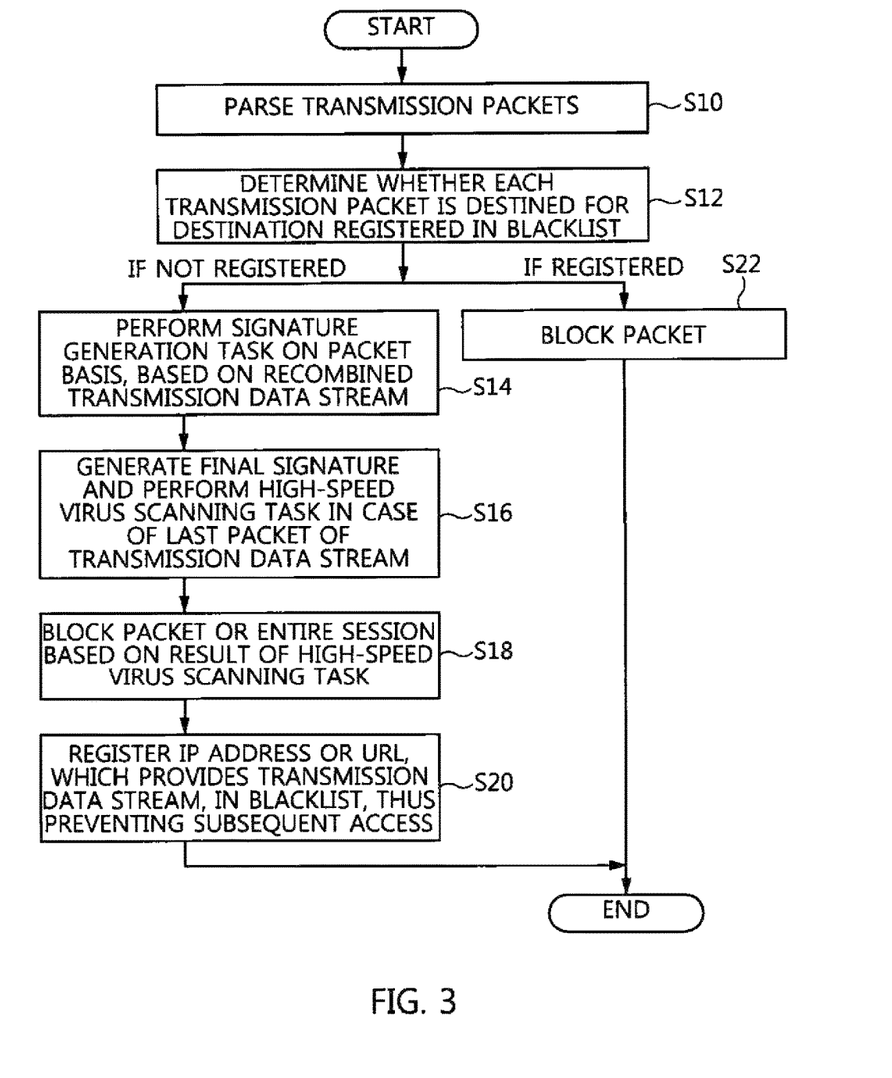
FIG. 3 is a flowchart schematically showing a method for performing a real-time network antivirus function according to an embodiment of the present invention.

FIG. 3 is a flowchart schematically showing a method for performing a real-time network antivirus function according to an embodiment of the present invention. The apparatus for performing a real-time network antivirus function is installed in line on a network.

First, when each transmission packet flows into the apparatus for performing a real-time network antivirus function, the packet processing unit 10 parses the transmission packets at step S10. The packet processing unit 10 transfers the parsed transmission packets to the caching unit 20.

Then, the caching unit 20 determines whether each transmission packet is destined for a destination registered in the blacklist at step S12.

If the destination of the transmission packet is not registered in the blacklist, the caching unit 20 transfers the transmission data stream recombined by the packet processing unit 10 to the packet-based checksum calculation unit 30. Accordingly, the packet-based checksum calculation unit 30 performs a signature generation task on a packet basis, based on the input transmission data stream, at step S14.

When the last packet of the transmission data stream is input, the packet-based checksum calculation unit 30 generates a final signature, and transfers the final signature to the virus scanning module unit 40. Hence, the virus scanning module unit 40 performs a high-speed virus scanning task by using the final signature of the packet-based checksum calculation unit 30 as input at step S16.

The virus scanning module unit 40 sends the result of the high-speed virus scanning task (i.e., detection result) to the detection and blocking unit 50.

The detection and blocking unit 50 logs the detection result from the virus scanning module unit 40, and blocks the corresponding packet or the entire session if the detection result indicates a malicious result at step S18. In contrast, if the detection result indicates a normal result, the detection and blocking unit 50 forwards the current packet.

Then, the detection and blocking unit 50 registers the IP address or a URL that provided the corresponding transmission data stream (i.e., the transmission data stream of the malicious file) in the blacklist of the caching unit 20, and then blocks subsequent access to the IP address or the URL at step S20.

Meanwhile, if the parsed packet is registered in the blacklist at step S12, the caching unit 20 may block the corresponding packet at step S22.

As described above, the method for performing a real-time network antivirus function according to the present invention generates the signature of the transmission file at the time of completion of file transmission while performing Deep Packet Inspection (DPI), but the time at which the signature generation task is performed is not limited to the time of completion of file transmission. Instead, in the embodiment of the present invention, the checksum of the transmission data stream is gradually calculated for each packet, and the signature of the transmission file is output at the moment at which the last packet has arrived. In other words, in the embodiment of the present invention, the load of a signature generation task is distributed for each packet. When such a method is used, the generation of a file signature may be guaranteed using a uniform task load for each packet, regardless of the size of the original file. Further, the virus scanning task may be performed at high speed in an in-memory-based or GPU-based manner.

Consequently, the system proposed in the present invention is capable of detecting the transmission data stream of a malicious file at the time at which the last transmission data packet was received, and blocking the traffic before data has been completely transmitted to the destination. Further, since the original file of the transmission data is not stored in storage such as memory or a hard disk, there is no concern of infringement of personal information.

Figure 4:
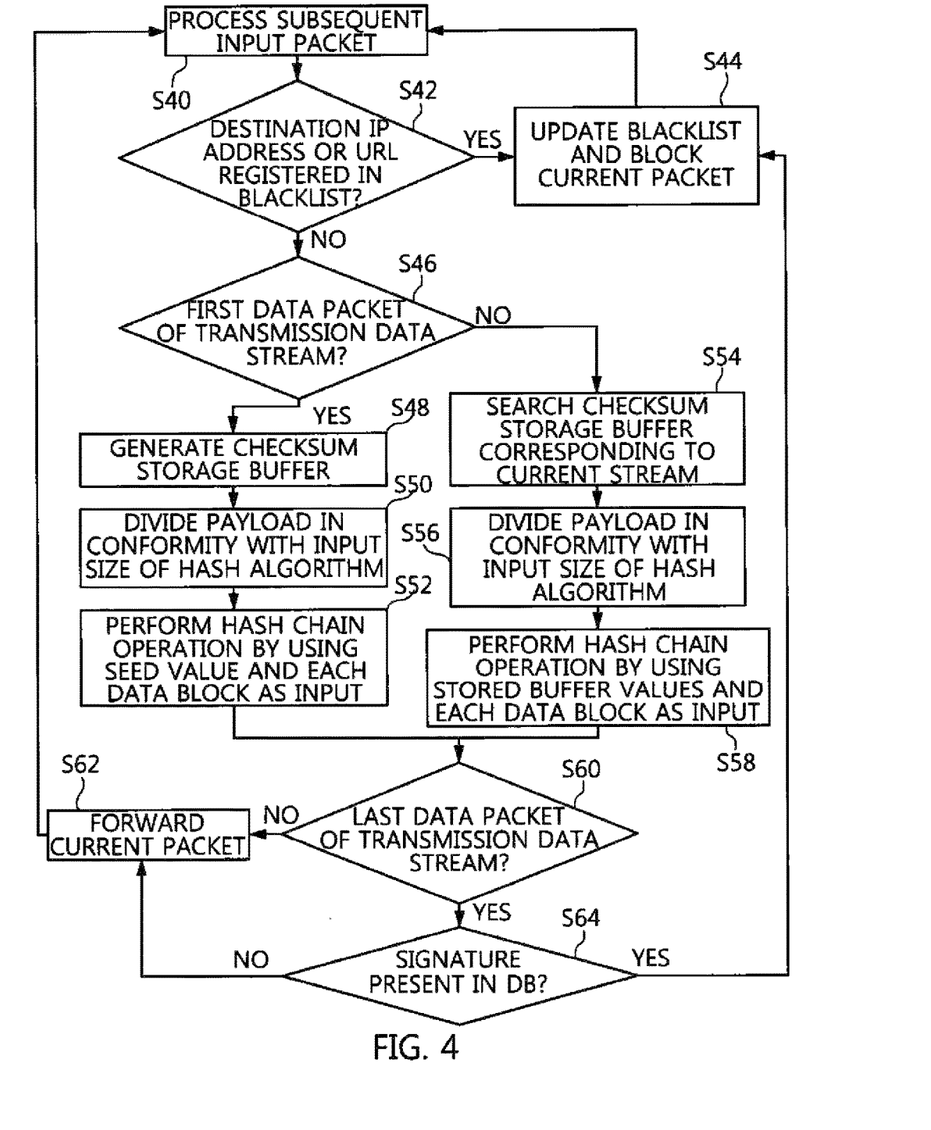
FIG. 4 is a flowchart showing in detail the method for performing a real-time network antivirus function according to an embodiment of the present invention.

FIG. 4 is a flowchart showing in detail a method for performing a real-time network antivirus function according to an, embodiment of the present invention.

As packets flow into the packet processing unit 10, the packet processing unit 10 parses the packets at step S40. In this case, the packet processing unit 10 captures, decodes and recombines input packet, and then extracts a transmission data stream. The input packet may be one or more input packets.

Meanwhile, the caching unit 20 determines whether each packet of the input packet is destined for a destination registered in the blacklist at step S42.

If the IP address or the URL of the destination of a currently input packet has been registered in the blacklist, the caching unit 20 blocks the currently input packet while updating the blacklist at step S44.

In contrast, if the IP address or URL of the destination of the currently input packet is not registered in the blacklist, the caching unit 20 transfers the recombined transmission data stream to the packet-based checksum calculation unit 30.

Accordingly, the packet-based checksum calculation unit 30 determines whether a first data packet of the transmission data stream is input at step S46.

If it is determined that the first data packet is input, the packet-based checksum calculation unit 30 generates a checksum storage buffer (not shown) and divides a current payload in conformity with the input size of a hash algorithm at steps S48 and S50. Thereafter, the packet-based checksum calculation unit 30 performs a hash chain operation by using a seed value and each data block as input, and then gradually calculates the signature of the file at step S52.

In contrast, if it is determined at step S46 that the input packet is not a first data packet, the packet-based checksum calculation unit 30 searches the checksum storage buffer (not shown) corresponding to the current transmission data stream, and divides the current payload in conformity with the input size of the hash algorithm at steps S54 and S56. Next, the packet-based checksum calculation unit 30 performs a hash chain operation by using values stored in the buffer and each data block as input, and then gradually calculates the signature of the file at step S58.

Thereafter, the packet-based checksum calculation unit 30 determines whether the last data packet of the transmission data stream has been input at step S60.

If the last data packet of the transmission data stream has not been input, the current packet is forwarded at step S62. Thereafter, the process returns to step S40, at which the subsequent input packet is processed.

In contrast, if the last data packet of the transmission data stream has been input, the virus scanning unit 40 performs a high-speed virus scanning task and then determines whether the signature is stored in a virus DB at step S64. Here, although not shown in the drawing, the virus DB may be regarded as being included in the virus scanning unit 40, or as being separately configured.

If the signature is not present in the virus DB, the process returns to the above-described step S62.

In contrast, if the signature is present in the virus DB, the detection and blocking unit 50 blocks the current packet (input packet) or the entire session while registering the IP address or URL that provided the corresponding transmission data stream in the blacklist of the caching unit 20, thus blocking subsequent access to the IP address or URL.

Figure 5:
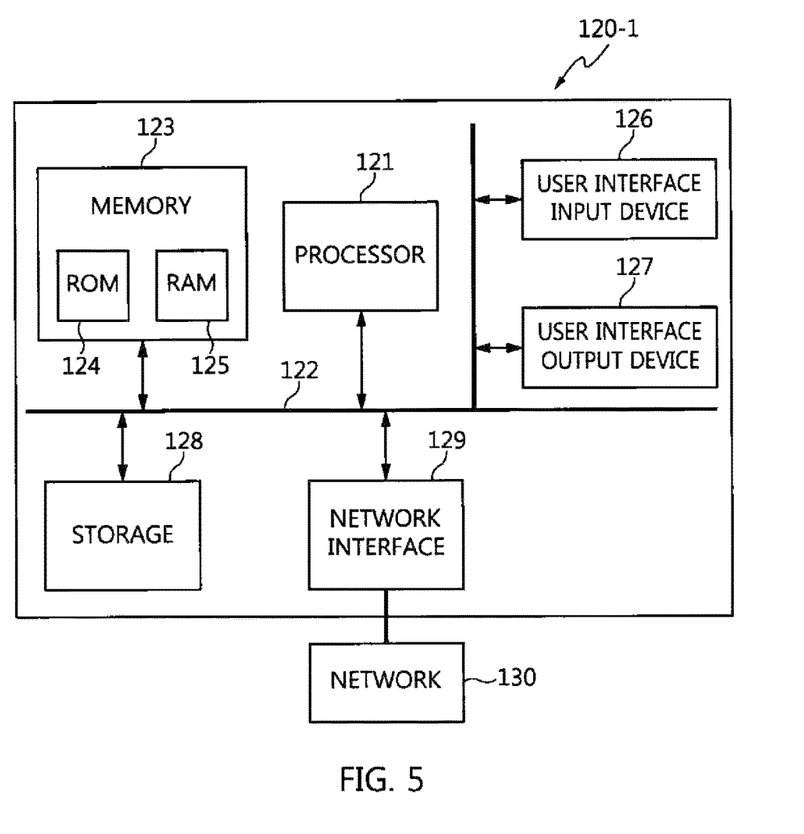
FIG. 5 is a diagram showing an example of a computer system in which the embodiment of the present invention is implemented.

The above-described embodiment of the present invention may be implemented by a computer system such as a computer-readable storage medium. As shown in FIG. 5, a computer system 120-1 may include one or more processors 121 communicating with each other via a bus 122, memory 123, a user interface input device 126, a user interface output device 127, and storage 128. The computer system 120-1 may further include a network interface 129 connected to a network 130. Each processor 121 may be a semiconductor device for executing processing instructions stored in a Central Processing Unit (CPU), the memory 123, or the storage 128. Here, both the memory 123 and the storage 128 may be various types of volatile or non-volatile storage media. The memory 123 may include, for example, Read Only Memory (ROM) 124 or Random Access Memory (RAM) 125.

Therefore, the embodiment of the present invention may be implemented as a non-temporary computer-readable medium in which computer-implemented methods or computer-executable instructions are recorded. When the computer-executable instructions are executed by the processors, the computer-executable instructions may be used to perform the method complying with at least one of the aspects of the present invention.

In accordance with the present invention having the above configuration, there is an advantage in that an antivirus function is performed on a network, thus blocking malicious files in real time.

Compared to a conventional scheme for generating a signature after the entire file has been reconstructed, the packet-based checksum calculation scheme according to the present invention distributes the checksum calculation overhead to individual packet processing procedures, thus preventing packet loss caused by an instantaneous increase in overhead upon processing network packets.

Meanwhile, high-speed virus scanning according to the present invention performs a signature matching task at high speed in an in-memory-based or GPU-based manner, thus minimizing overhead upon processing the last packet of a transmission data stream.

Further, the present invention prevents an unnecessary virus scanning task from occurring via a caching scheme that automatically generates a detection rule based on the result of detection. Accordingly, computing resources may be saved, and other clients may be prevented from accessing the same IP address or URL and downloading malicious files.

Finally, the method for performing a real-time network antivirus function according to the present invention does not store the entire file included in a transmission data stream, thereby minimizing the issue of infringement of personal information.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for performing a real-time network antivirus function, comprising:
   one or more computer-executable units being configured and executed by a processor using algorithms associated with at least one non-transitory storage device, the algorithms, when executed, causing the processor to execute the one or more computer-executable units, the one or more computer-executable units comprising,
   in response to receipt of packet flows, a packet processing unit for parsing the packet flows and outputting a transmission data stream;
   in response to determination of the transmission data stream not being registered in a blacklist, a caching unit for transferring the transmission data stream recombined by the packet processing unit to a packet-based checksum calculation unit, and the packet-based checksum calculation unit for performing a signature generation task on a packet basis based on the transmission data stream, and
   in response to detection of a last packet of the transmission data being input, the packet-based checksum calculation unit for generating a final signature corresponding to the last packet included in the transmission data stream;
   in response to receipt of the final signature, a virus scanning unit for performing virus scanning by using the final signature transferred from the packet-based checksum calculation unit;
   a detection and blocking unit for blocking the packet flows or transmitting the packet flows to a destination, based on a result output from the virus scanning unit;
   wherein the detection and blocking unit is configured to, if the result output from the virus scanning unit indicates a malicious result, block the packet flows, and if the result indicates a normal result, forward the packet flows; and
   the caching unit for updating the blacklist, based on a result output from the detection and blocking unit; wherein the caching unit is configured to automatically generate a detection rule for an Internet Protocol (IP) address or a Uniform Resource Locator (URL), which provides a transmission data stream of a malicious file, based on the result output from the detection and blocking unit, and to input the generated detection rule to the blacklist.

2. The apparatus of claim 1, wherein the packet-based checksum calculation unit generates the signature by dividing the transmission data stream into N data blocks and consecutively performing a hash digest operation on the N data blocks.

3. The apparatus of claim 1, wherein the virus scanning unit compares a virus database (DB) with the signature in an in-memory-based or Graphics Processing Unit (GPU)-based manner.

4. The apparatus of claim 3, wherein the virus scanning unit utilizes a data structure and algorithms, in which a search time and a DB storage space are taken into consideration, upon performing the virus scanning.

5. The apparatus of claim 4, wherein the data structure is one of a self-balancing binary search tree, a hash table, a one-dimensional array, and a bloom filter.

6. A computer-implemented method for performing a real-time network antivirus function, comprising:
   in response to receipt of packet flows, parsing, by a processor packet flows and outputting a transmission data stream;
   in response to determination of the transmission data stream not being registered in a blacklist, transferring the transmission data stream recombined by packet processing unit to a packet-based checksum calculation unit, and performing a signature generation task on a packet basis based on the transmission data stream, and
   in response to detection of a last packet of the transmission data being input, generating a final signature corresponding to the last packet included in the transmission data stream;
   in response to receipt of the final signature, performing virus scanning by using the final signature;
   blocking the packet flows or transmitting, by the detection and blocking unit, the packet flows to a destination, based on a result of virus scanning;
   wherein blocking the packet flows, or transmitting the packet to the destination comprises: if the result of the virus scanning indicates a malicious result, blocking the packet flows; and if the result indicates a normal result, forwarding the packet flows; and
   updating a blacklist based on a result of blocking the packet flows or transmitting the packet flows to the destination;
   wherein updating the blacklist comprises: automatically generating a detection rule for an Internet Protocol (IP) address or a Uniform Resource Locator (URL), which provides a transmission data stream of a malicious file, based on the result of blocking the packet flows or transmitting the packet flows to the destination; and inputting the generated detection rule to the blacklist.

7. The method of claim 6, wherein outputting the signature comprises generating the signature by dividing the transmission data stream into N data blocks and consecutively performing a hash digest operation on the N data blocks.

8. The method of claim 6, wherein performing the virus scanning comprises comparing a virus database (DB) with the signature in an in-memory-based or Graphics Processing Unit (GPU)-based manner.

9. The method of claim 8, wherein performing the virus scanning comprises utilizing a data structure and an algorithm, in which a search time and a DB storage space are taken into consideration, upon performing the virus scanning.

10. The method of claim 9, wherein the data structure is one of a self-balancing binary search tree, a hash table, a one-dimensional array, and a bloom filter.

\* \* \* \* \*